(12) United States Patent
Tajan et al.

(10) Patent No.: US 10,501,168 B2
(45) Date of Patent: Dec. 10, 2019

(54) STIFFENED HUB FOR UNSHROUDED PROPELLER

(71) Applicant: SAFRAN AIRCRAFT ENGINES, Paris (FR)

(72) Inventors: Sebastien Emile Philippe Tajan, Moissy-Cramayel (FR); Charles-Henri Michel Marie Derrez, Moissy-Cramayel (FR); Caroline Adeline Herauville, Moissy-Cramayel (FR); Anthony Lafitte, Moissy-Cramayel (FR); Cyril Roger Yves Le Pecheur, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 344 days.

(21) Appl. No.: 15/312,381

(22) PCT Filed: May 7, 2015

(86) PCT No.: PCT/FR2015/051214
§ 371 (c)(1),
(2) Date: Nov. 18, 2016

(87) PCT Pub. No.: WO2015/177430
PCT Pub. Date: Nov. 26, 2015

(65) Prior Publication Data
US 2017/0081018 A1    Mar. 23, 2017

(30) Foreign Application Priority Data
May 21, 2014  (FR) ...................... 14 54560

(51) Int. Cl.
*B64C 11/06* (2006.01)
*F04D 29/32* (2006.01)
*F01D 7/00* (2006.01)

(52) U.S. Cl.
CPC ............... *B64C 11/06* (2013.01); *F01D 7/00* (2013.01); *F04D 29/326* (2013.01); *Y02T 50/66* (2013.01)

(58) Field of Classification Search
CPC ......... B64C 11/02; B64C 11/04; B64C 11/06; F01D 7/00; F04D 29/362
See application file for complete search history.

(56) References Cited

U.S. PATENT DOCUMENTS

| 4,762,466 A * | 8/1988 | Bouiller | B64C 11/06 416/205 |
| 4,863,352 A * | 9/1989 | Hauser | B64C 11/06 416/204 R |

(Continued)

FOREIGN PATENT DOCUMENTS

| FR | 2641251 A1 | 7/1990 |
| FR | 2992346 A1 | 12/2013 |

(Continued)

OTHER PUBLICATIONS

International Search Report with English language translation, dated Aug. 3, 2015, PCT Application No. PCT/FR2015/051214.

*Primary Examiner* — David E Sosnowski
*Assistant Examiner* — Maranatha Boardman
(74) *Attorney, Agent, or Firm* — Womble Bond Dickinson (US) LLP (57) ABSTRACT

The invention relates to a hub for an unducted propeller (14) having variable-pitch blades (18) of a turbine engine, comprising two parallel annular side walls (34) between which are arranged rings (36) which are distributed angularly in a regular manner around a longitudinal axis (A) of the hub, (Continued)

which are connected to the annular side walls (34), and which comprise compartments (26) receiving bearings (32) having radial axes (R) for guiding in rotation roots (30) of blades of said propeller, said rings (36) being connected in pairs by connection means (40) which are arranged between the annular side walls (34) and which comprise substantially radial reinforcing partitions (42, 44, 46), characterised in that at least some of said reinforcing partitions (42, 44, 46) are connected to said annular side walls (34).

9 Claims, 5 Drawing Sheets (56) References Cited

U.S. PATENT DOCUMENTS

| | | | |
|---|---|---|---|
| 5,112,191 A * | 5/1992 | Strock | B64C 11/06 416/129 |
| 8,876,480 B2 * | 11/2014 | Witt | F04D 29/023 416/204 R |
| 9,039,376 B2 * | 5/2015 | Udall | B64C 11/06 416/205 |
| 9,255,583 B2 * | 2/2016 | Boston | B64C 11/06 |
| 9,434,467 B2 * | 9/2016 | Mackie | B64C 11/08 |
| 10,118,710 B2 * | 11/2018 | Derrez | B64C 11/02 |
| 2011/0176924 A1 * | 7/2011 | Gallet | B64C 11/04 416/220 R |
| 2012/0257975 A1 * | 10/2012 | Boston | B64C 11/06 416/147 |
| 2013/0101434 A1 * | 4/2013 | Udall | B64C 11/06 416/244 R |

FOREIGN PATENT DOCUMENTS

| | | |
|---|---|---|
| FR | 2993919 A1 | 1/2014 |
| GB | 1163752 A | 9/1969 |
| WO | WO-2011069981 A1 | 6/2011 |

* cited by examiner

STIFFENED HUB FOR UNSHROUDED PROPELLER

The present invention relates to a hub of a propeller having variable-pitch blades for a turbine engine of the unducted-fan type (also known as "open rotor").

The fan of a turbine engine of this type typically comprises two coaxial and counter-rotating external propellers, upstream and downstream respectively, which are each set into rotation by a turbine of the turbine engine and extend, substantially radially, outside the nacelle of said turbine engine.

Each propeller usually comprises a hub for supporting said blades which generally have a polygonal shape. Said hub is concentric with the longitudinal axis of the turbine engine and is composed of two parallel annular side walls between which are arranged rings which are distributed angularly in a regular manner around a longitudinal axis of the hub, which are connected to the annular side walls and which receive compartments for bearings for guiding in rotation roots of radially oriented blades. Said rings are separated from one another by intermediate walls which extend substantially between the consecutive rings.

A coupling means further connects the hub to a turbine rotor element of the turbine engine.

The blades can rotate in the compartments of the rings of the hub and for this purpose are set into rotation about the respective axes thereof by suitable means so as to adjust the angular pitch of the blades, and to optimise said pitch in accordance with the operating conditions of the turbine engine.

In addition, in operation, the rotating parts of the turbine engine, and in particular the hub and the blades of the propeller, are subjected, to varying degrees, to significant stresses, whether these be of the mechanical, thermal, or aerodynamic type, etc. In particular, the cylindrical compartments of the blades tend to deform under the significant forces which are exerted in the region of the radially oriented rings of the polygonal hub, until they adopt an oval design. Indeed, as the regions of the annular side walls to which the rings are connected are wide and extend over a significant peripheral portion of the rings in order to provide mechanical strength and rigidity, the pull forces exerted by the side walls on the rings cause an out-of-roundness of said rings. Thus, the rolling tracks of said bearings, which are provided between the cylindrical compartment of each ring and a rotating device (having a plate and a ring in particular) supporting the blade and making it possible to vary the pitch thereof, is at risk of deteriorating rapidly until it is no longer able to ensure the proper operation of the blades, with the consequences that this can bring about.

The object of the present invention is to remedy these disadvantages, and the invention relates to a hub of a propeller having variable-pitch blades, the design of which ensures that there is no deformation of the cylindrical compartments of the rings.

According to a design which is disclosed by the application WO-2011/069981 (A1), a similar unducted propeller is proposed, a polygonal hub of which comprises means for connecting the rings which are arranged between the annular side walls and which comprise substantially radial reinforcing partitions. The reinforcing partitions are arranged, with respect to the longitudinal axis A of the hub, in a radial plane which is parallel to the parallel side walls and/or in an orthoradial plane which is parallel to the general plane of the horizontal intermediate wall which extends substantially between two consecutive rings.

This design provides overall satisfaction. However, it is possible to further reduce the phenomena of out-of-roundness of the rings of the hub.

For this purpose, the invention proposes a new arrangement of the intermediate walls proposing a partitioning of the connection means which are intended to achieve a compromise which makes it possible to increase the rigidity of said intermediate walls in the transverse and longitudinal directions whilst ensuring a high mechanical strength and a reduced mass of said walls.

For this purpose, the invention proposes a hub of the type described previously, characterised in that at least some of said reinforcing partitions are connected to said annular side walls.

This design makes it possible to provide an intermediate wall which can be lightened by recesses which are delimited between specific reinforcing partitions and which is nevertheless rigidified by the presence of radial reinforcing partitions which are oriented in multiple directions.

In preferred embodiments of the invention, the connection means comprise first reinforcing partitions bordering the side walls, and/or second reinforcing partitions bordering the rings, and at least third reinforcing partitions which define recesses between the rings.

Advantageously, in these embodiments, the reinforcing partitions and the corresponding recesses extend between two consecutive rings symmetrically on either side of a transverse plane passing through the centres of the two rings which are adjacent to the intermediate wall and symmetrically on either side of a median axial plane which is equidistant from the centres of the two rings which are adjacent to said intermediate wall.

According to a first variant of these embodiments, the means for connecting two adjacent rings define a central recess and four peripheral recesses which are regularly distributed around the central recess.

Thus, according to a first embodiment of the invention, the central recess has a cross section in the shape of a hexagon and each peripheral recess has a substantially triangular cross section.

Thus, according to a second embodiment of the invention, the central recess has a circular cross section, and each peripheral recess has a substantially trapezoidal cross section.

According to a second variant of these embodiments, the means for connecting two adjacent rings comprise at least two third partitions which cross each other and which define four main recesses.

Thus, according to a third embodiment of the invention, the third partitions are oriented in the transverse and longitudinal directions.

Thus, according to a fourth embodiment of the invention, the third partitions are oriented diagonally.

In other embodiments of the invention, in particular fifth to ninth embodiments of the invention, the means for connecting two adjacent rings comprise at least first partitions bordering the side walls and second partitions bordering the rings.

In particular, according to fifth, eighth and ninth embodiments of the invention, the second partitions are each substantially "C"-shaped, a middle portion of which has a transverse thickness which is greater than that of the end portions thereof.

Advantageously, the invention proposes a turbine engine of the type described above.

The invention will be better understood, and other details, features and advantages of the present invention will become clearer upon reading the following description, given by way of non-limiting example with reference to the accompanying drawings, in which:

In the following description, same reference numerals denote parts which are the same or have similar functions.

Figure 1:
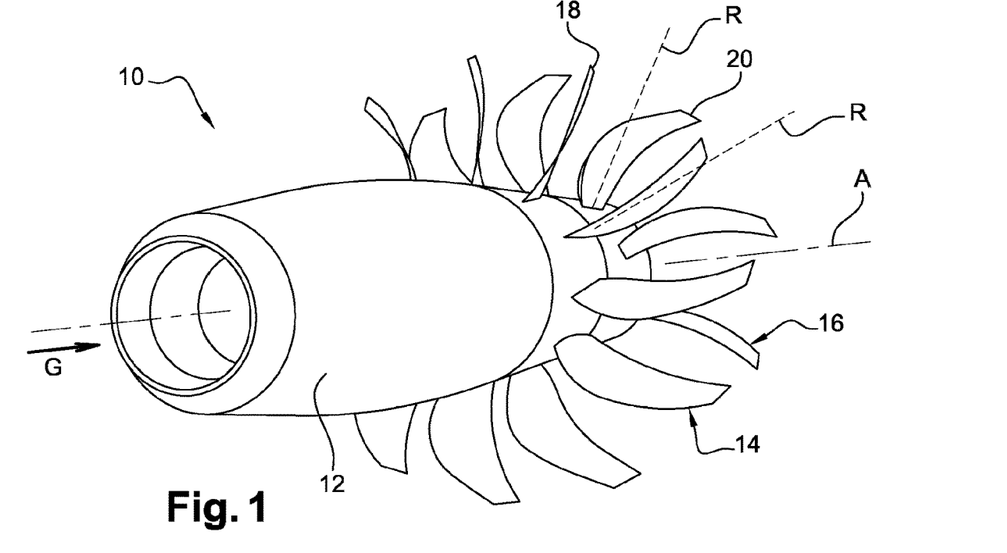
FIG. 1 is a perspective overall view of a turbine engine having unducted propellers comprising a propeller according to a piece of prior art.

FIG. 1 shows a turbine engine 10 having an unducted fan (also known as an "open rotor") which comprises, in a known manner, a substantially cylindrical nacelle 12.

Inside the nacelle 12 are arranged, from upstream to downstream and in the direction of flow "G" of the gases inside the turbine engine having a longitudinal axis "A", a compressor, an annular combustion chamber, a high-pressure turbine (not shown), and two low-pressure turbines which are counter rotating, that is to say that they rotate in two opposite directions about the longitudinal axis "A" of the turbine engine 10.

Each of the inner downstream turbines is connected for conjoint rotation to an outer propeller 14, 16 extending radially outside the nacelle 12 of the turbine engine.

The air flow which enters the turbine engine 10 is compressed then is mixed with fuel and burned in the combustion chamber, the combustion gases then passing into the turbines in order to set into rotation the propellers 14, 16 which provide the majority of the thrust produced by the turbine engine 10. The combustion gases leaving the turbines are discharged through a nozzle (not shown) in order to increase the thrust.

The propellers 14, 16 are arranged coaxially one behind the other and comprise a plurality of respective blades 18, 20 which are distributed regularly around the longitudinal axis "A" of the turbine engine 10. Said blades 18, 20 extend substantially radially and are of the type having a variable pitch, that is to say that they can rotate about the radial axes "R" thereof so as to optimise the angular position thereof according to the operating conditions of the turbine engine.

Figure 2:
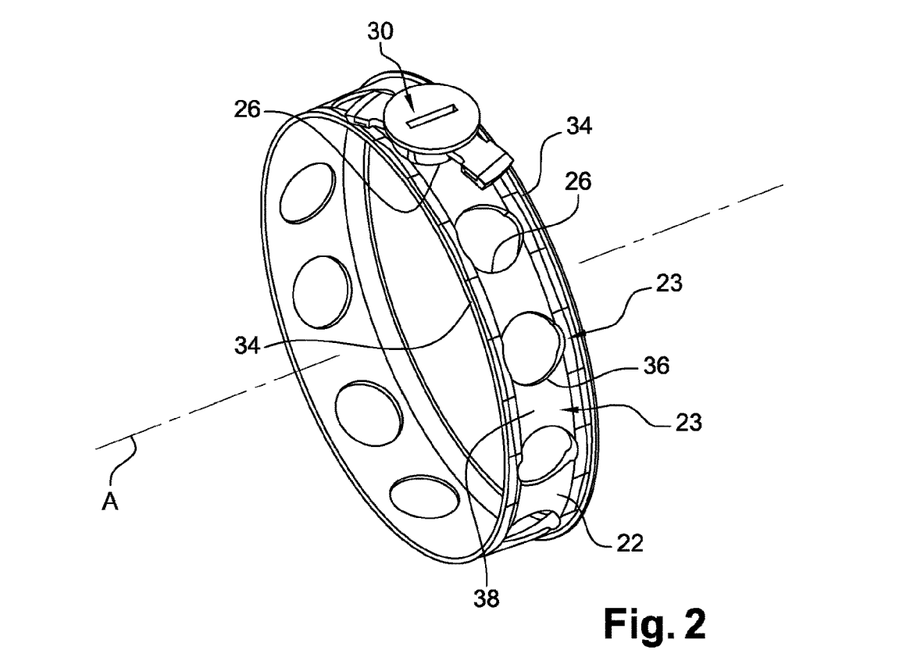
FIG. 2 is an exploded perspective view of an annular hub for the turbine engine from FIG. 1.

As shown in FIG. 2, each of the propellers 14, 16 shown previously in FIG. 1 comprises an associated hub 22 receiving in rotation roots of the blades 18, 20. The roots of the blades 18, 20 are respectively mounted in rotation in compartments 26 of the hub 22.

More particularly, as shown in FIG. 2, the hub 22 comprises compartments 26 receiving roots 30 of the blade 14 shown previously in FIG. 1.

Figure 3:
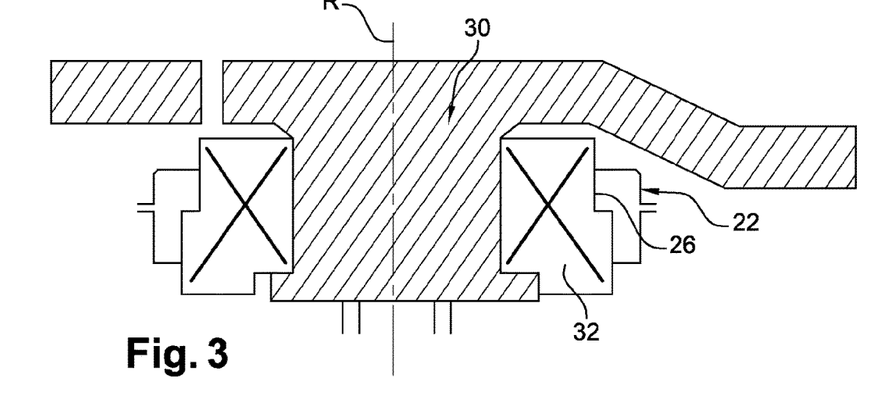
FIG. 3 is a detailed sectional view of a propeller of the turbine engine from FIG. 1, FIGS. 4A and 4B are perspective views of the external and internal faces respectively of an angular portion of the polygonal hub for the propeller from FIG. 1.

As shown in FIG. 3, each blade root 30 is mounted for rotation in the compartment 26 of the hub 22 by means of a bearing 32 having a radial axis "R". The axes "R" of the compartments 26 of the hubs converge, in the same radial plane, towards the longitudinal axis "A" of the turbine engine 10.

Thus, according to the speed and the flight phases of the aircraft, it is possible to modify the pitch of the blades 14 by a global command (not shown) acting on the angle of rotation of the roots 30 of the blades 14.

The hub 22 is generally structurally integral and it is generally said to be "polygonal", that is to say that, as shown in particular by FIGS. 2 and 5 to 14, it is produced in the form of a series of angular portions 23 which are substantially planar, the joining of which forms a closed ring. However, this configuration is not intended to limit the invention.

Figure 4A:
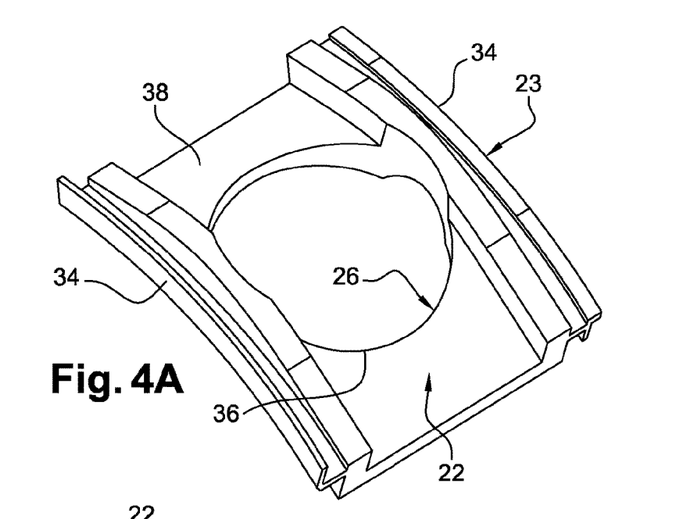
Figure 4B:
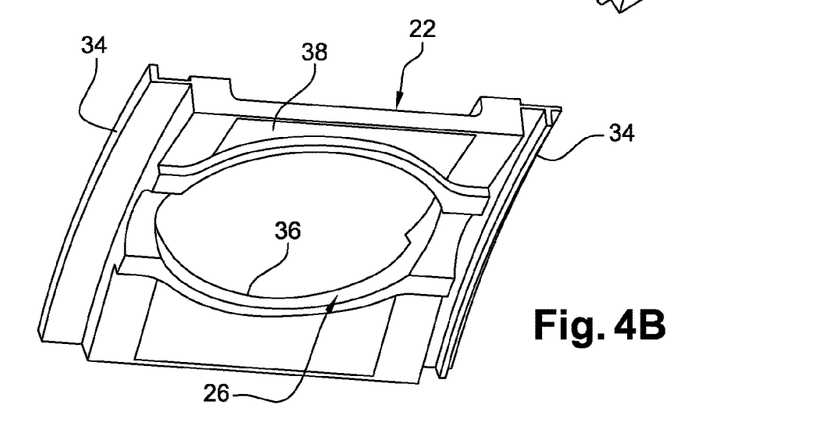

As shown in FIGS. 2, 4A and 4B, the hub 22 essentially comprises two parallel annular side walls 34 between which are arranged rings 36 which are distributed angularly in a regular manner around the longitudinal axis "A". The rings 36 are connected to the annular side walls 34 and receive the compartments 26 receiving the bearings which allow the rotation of the roots of the blades.

The rings 36 are separated from one another by intermediate walls 38 which are also distributed angularly in a regular manner and which thus alternate with the rings 36.

For the purpose of lightening the hub 22, WO-2011/069981 (A1) proposed such a hub 22 having intermediate walls 38 which are perforated by means of through holes. In order to remedy the problems in terms of rigidity which are caused by hollowing out the intermediate connecting walls, and in particular to prevent the deformation of the rings leading to the out-of-roundness thereof following the intense forces which are exerted thereon, the hub comprises connection means between the rings which are arranged between the annular side walls and which comprise substantially radial reinforcing partitions. The reinforcing partitions are arranged, with respect to the longitudinal axis A of the hub, in a radial plane which is parallel to the parallel side walls and/or in an orthoradial plane which is parallel to the general plane of the horizontal intermediate wall.

According to this design, the connection means oppose the pendulous movement due to the blades, which would be at risk of being amplified by the reduced extent of the connection regions between the rings and the annular side walls.

This design provides overall satisfaction. However, the radial reinforcing partitions extend only in a transverse plane. Yet it is possible to further reduce the twisting phenomena of the intermediate wall in order to further reduce the phenomena of out-of-roundness of the rings by proposing radial reinforcing partitions which extend in other directions.

To that effect, the invention proposes a partitioning of the connection means for this purpose, making it possible to increase the rigidity of the intermediate wall in the transverse and longitudinal directions.

For this purpose, as shown in FIGS. 5 to 14, the invention proposes a hub 22 of the type described previously, characterised in that at least some of said reinforcing partitions are connected to said annular side walls 34.

As shown in FIGS. 5 to 14, the intermediate walls 38 essentially comprise connection means 40 having reinforcing partitions.

Thus, in preferred embodiments of the invention shown in FIGS. 5 to 8, the connection means 40 comprise first reinforcing partitions 42 bordering the side walls 34, and/or second reinforcing partitions 44 bordering the rings 36, and/or third reinforcing partitions 46 which define recesses 48, 50 between the rings 36.

Preferably, the reinforcing partitions 42, 44, 46 and the corresponding recesses 48, 50 extend between two consecutive rings 36 symmetrically on either side of a transverse plane "PT" passing through the centres of two adjacent rings 36 and symmetrically on either side of a median axial plane "PM" which is equidistant from the centres of the two adjacent rings 36.

This configuration ensures a uniform distribution of the recesses 48, 50 over the inner face 25 of the intermediate wall 38.

In the configuration shown here, the recesses 48, 50 are blind and open solely onto an inner face 25 of the hub 22. In this configuration, an outer face 27 of the hub 22 does not comprise reinforcing partitions. However, it will be understood that this configuration is not intended to limit the invention.

Advantageously, in the preferred embodiments of the invention, the recesses 48, 50 are provided to occupy the majority of the inner face 25 of the intermediate wall 38 in order to firstly lighten said intermediate wall 38 as much as possible and secondly so that said lightening is accompanied by a rigidification of the wall 38 by the reinforcing partitions 42, 44, 46 in order to prevent the deformations of the intermediate wall 38 which would be at risk of causing the out-of-roundness of the rings 36.

Figure 5:
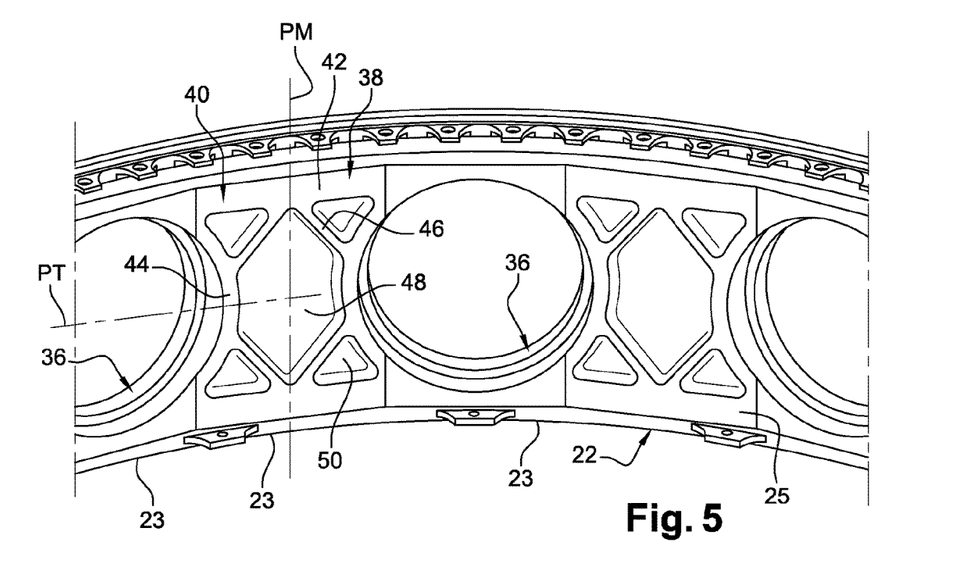
FIG. 5 is a perspective view of an inner face of a polygonal hub which is produced according to a preferred embodiment of the invention.
Figure 6:
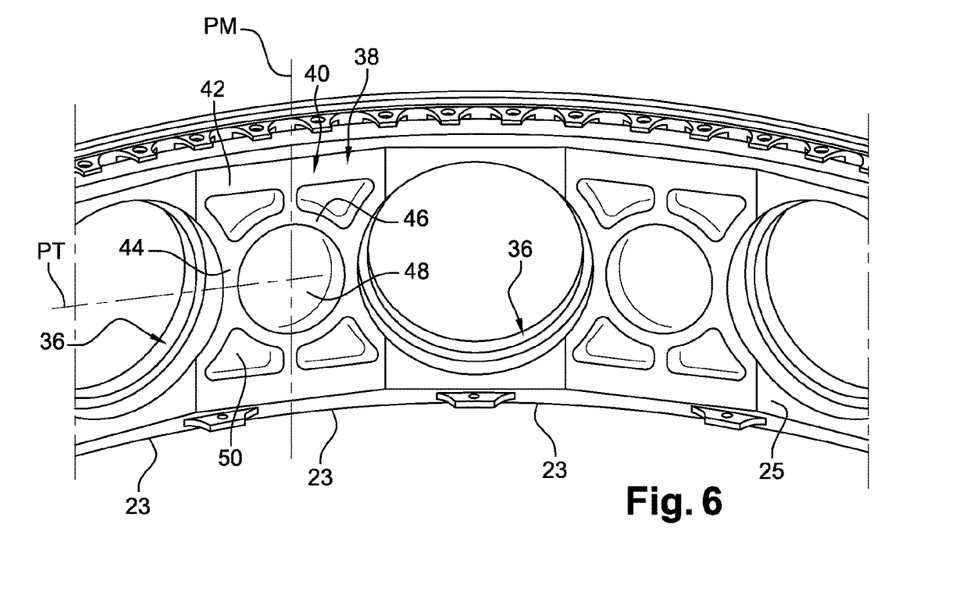
FIGS. 6 to 9 are perspective views of inner faces of polygonal hubs according to other embodiments of the invention.

According to a first variant of these embodiments, as shown in FIGS. 5 and 6, the means 40 for connecting two adjacent rings 36 define a central recess 48 and four peripheral recesses 50 which are regularly distributed around the central recess.

According to a first embodiment of the invention shown in FIG. 5, the central recess 48 has a cross section in the shape of a hexagon, and each peripheral recess 50 has a substantially triangular cross section. The central recess 48 is delimited by two second reinforcing partitions 44 and four third reinforcing partitions 46, and each peripheral recess is delimited by a first reinforcing partition 42, a second reinforcing partition 44 and a third reinforcing partition 46.

According to a second embodiment of the invention shown in FIG. 6, the central recess 48 has a circular cross section, and each peripheral recess 50 has a substantially trapezoidal cross section. The central recess 48 is delimited by two second reinforcing partitions 44 and four third reinforcing partitions 46, and each peripheral recess is delimited by a first reinforcing partition 42, a second reinforcing partition 44 and two third reinforcing partitions 46.

Figure 7:
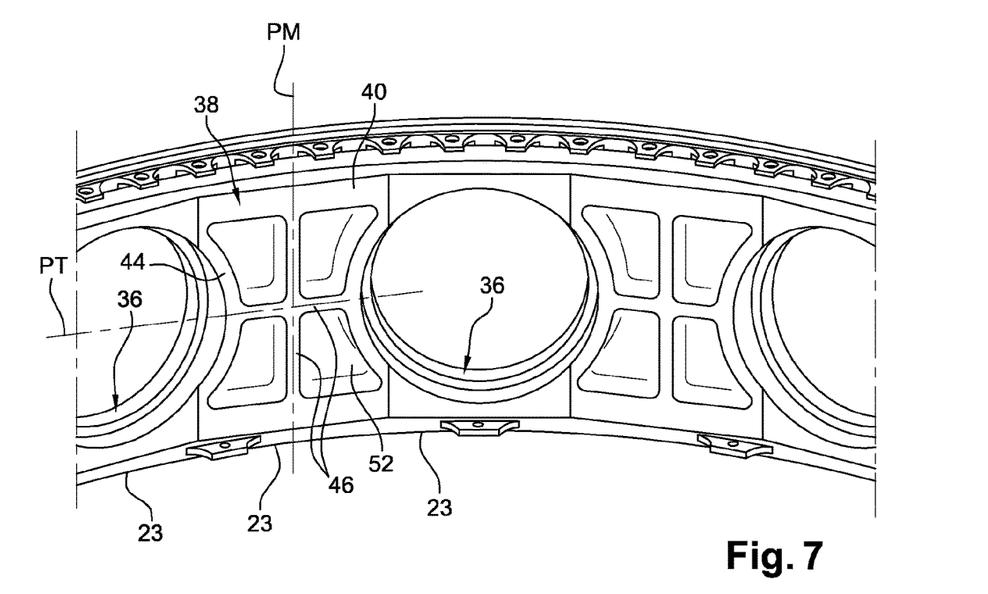
Figure 8:
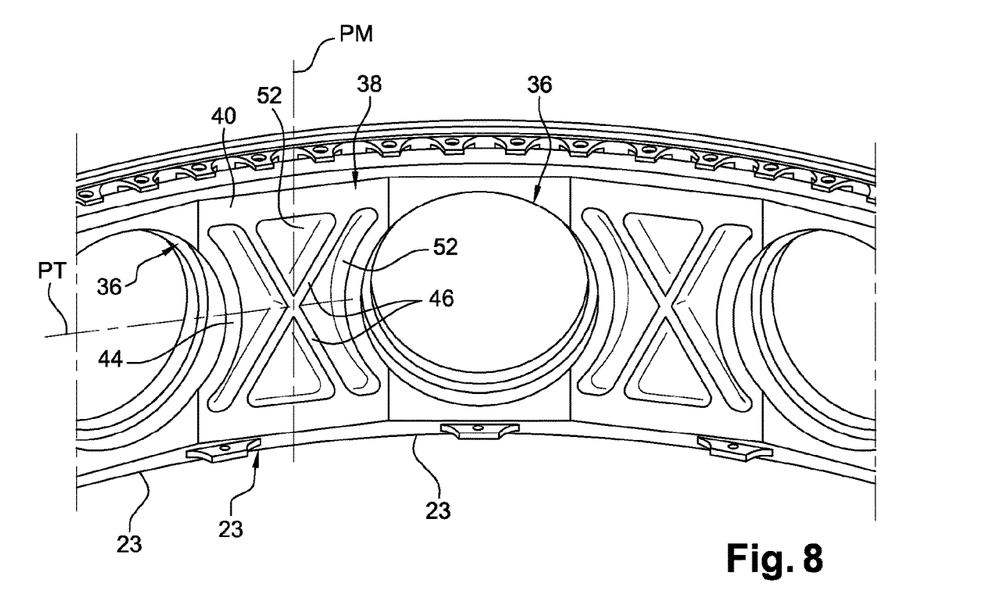

According to a second variant of these embodiments, as shown in FIGS. 7 and 8, the means 40 for connecting two adjacent rings 36 comprise at least two third reinforcing partitions 46 which cross each other and which define four main recesses 52.

According to a third embodiment shown in FIG. 7, the third reinforcing partitions 46 are oriented in the transverse and longitudinal directions, that is to say following the lines of the transverse plane "PT" and of the median plane "PM". The recesses 52 are distributed in a check pattern in the intermediate wall 38 and are each delimited by a first reinforcing partition 42, a second reinforcing partition 44 and two third reinforcing partitions 46.

According to a fourth embodiment shown in FIG. 8, the third reinforcing partitions 46 are oriented diagonally. The recesses 54 are distributed substantially in the shape of a four-leaf clover in the intermediate wall 38 and are each delimited by a first reinforcing partition 42 or else a second reinforcing partition 44 and two third reinforcing partitions 46.

It will be understood that the means 40 for connecting two rings could comprise a lower or higher number of reinforcing partitions, subdividing the intermediate wall for example into two or eight recesses.

Figure 9:
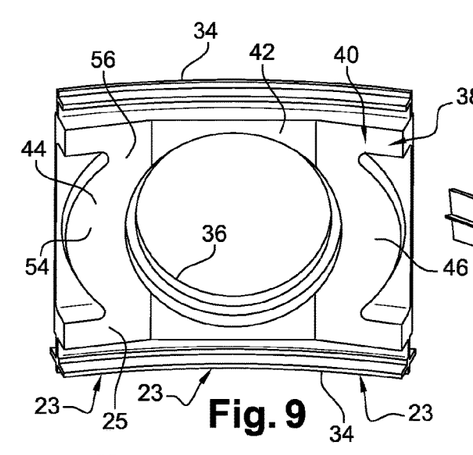
Figure 10:
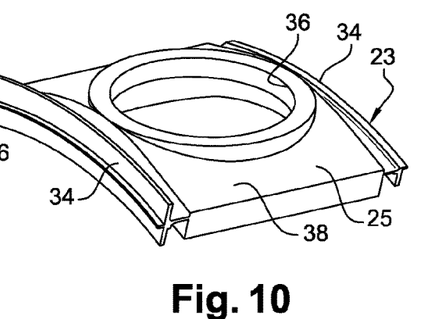
FIG. 10 is a perspective view of the outer face of the polygonal hubs from FIGS. 5 to 8, FIGS. 11 to 14 are perspective views of outer faces of polygonal hubs according to the invention.

In other embodiments of the invention, in particular fifth to ninth embodiments of the invention shown in FIG. 9 and in FIGS. 11 to 14, the means 40 for connecting two adjacent rings 36 comprise at least first reinforcing partitions 42 bordering the side walls 34, and second reinforcing partitions 44 bordering the rings 36.

According to a fifth embodiment of the invention, the connection means 40 are, as previously, arranged on an inner face 25 of the intermediate wall 38. However, the means 40 for connecting two adjacent rings 36 comprise only first reinforcing partitions 42 bordering the side walls 34, and second reinforcing partitions 44 bordering the rings 36.

In this embodiment, the second reinforcing partitions 44 are each substantially "C"-shaped, a middle portion 54 of which has a transverse thickness which is greater than that of the end portions 56 thereof.

Figure 11:
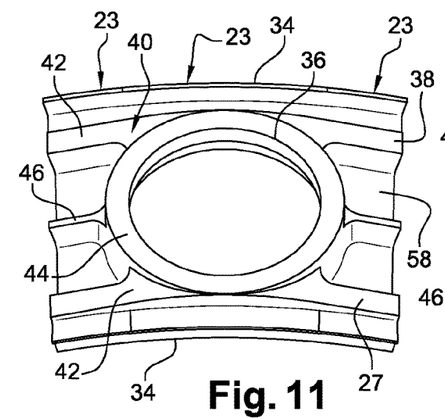
Figure 12:
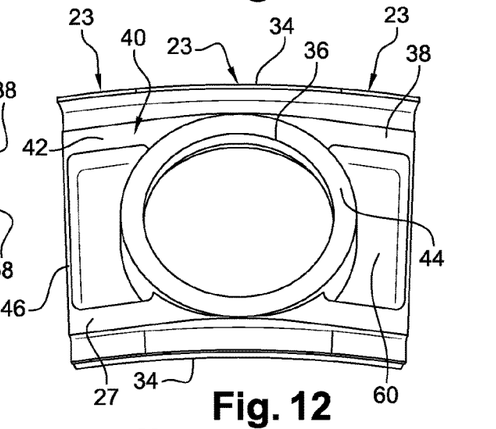

According to sixth and seventh embodiments shown in FIGS. 11 and 12, the connection means 40 are arranged on an outer face 27 of the intermediate wall 38. The means 40 for connecting two adjacent rings 36 comprise at least first reinforcing partitions 42 bordering the side walls 34, and at least second reinforcing partitions 44 bordering the rings 36.

In said sixth and seventh embodiments, the connection means 40 comprise, in a manner which is not intended to limit the invention, third reinforcing partitions 46 which are arranged between the first partitions 42.

Said third reinforcing partitions 46 can extend transversely, as shown in FIG. 11, and thus divide the intermediate wall 38 into two recesses 58 having a transverse orientation.

In one variant, said third reinforcing partitions 46 can extend longitudinally, as shown in FIG. 12, and thus divide the intermediate wall 38 into two recesses 60 having a transverse orientation.

Figure 13:
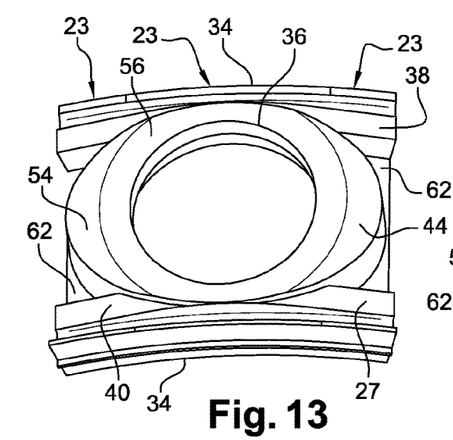
Figure 14:
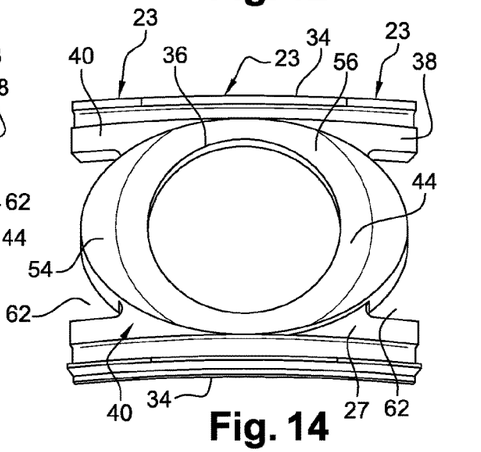

According to eighth and ninth embodiments shown in FIGS. 13 and 14, the connection means 40 are arranged on an outer face 27 of the intermediate wall 38. The means 40 for connecting two adjacent rings 36 comprise at least first reinforcing partitions 42 bordering the side walls 34, and at least second reinforcing partitions 44 bordering the rings 36.

In these embodiments, the second reinforcing partitions 44 are each substantially "C"-shaped, a middle portion 54 of which has a transverse thickness which is greater than that of the end portions 56 thereof.

The first and second reinforcing partitions 42, 44 define a complementary recess 62 in the intermediate wall 38. Said recess 62 is blind in the case of the eighth embodiment from FIG. 13, or on the contrary can open out, in the case of the ninth embodiment from FIG. 14.

The invention can thus be applied to a turbine engine comprising a propeller equipped with a hub 22 of the type described previously and makes it possible to considerably improve the reliability of such a propeller.

The invention claimed is:

1. The hub for an unducted propeller having variable-pitch blades of a turbine engine, comprising two parallel annular side walls between which are arranged rings which are distributed angularly in a regular manner around a longitudinal axis of the hub, which are connected to the annular side walls, and which comprise compartments which are designed to receive bearings having radial axes for guiding in rotation roots of blades of said propeller, said rings being connected in pairs by connection means which are arranged between the annular side walls and which comprise reinforcing partitions which are substantially radial with respect to the longitudinal axis of the hub, wherein at least some of said reinforcing partitions are connected to said annular side walls.

2. A hub according to claim 1, wherein the connection means comprise first reinforcing partitions bordering the side walls, and/or second reinforcing partitions bordering the rings, and/or third reinforcing partitions which define recesses between the rings.

3. A hub according to claim 2, wherein the connection means of two adjacent rings of the rings define a central recess and four peripheral recesses which are regularly distributed around the central recess.

4. A hub according to claim 3, wherein the central recess has a circular cross section and wherein each peripheral recess has a substantially trapezoidal cross section.

5. A hub according to claim 3, wherein the central recess has a cross section in the shape of a hexagon and in that each peripheral recess has a substantially triangular cross section.

6. A hub according to claim 2, wherein the connection means of two adjacent rings of the rings comprise at least two third partitions which cross each other and which define four main recesses.

7. A hub according to claim 6, wherein the third partitions are oriented either in the transverse and longitudinal directions or diagonally.

8. A hub according to claim 2, wherein the connection means of two adjacent rings of the rings comprise at least first partitions bordering the side walls, and at least second partitions bordering the rings.

9. A turbine engine, comprising at least one hub according to claim 1.

* * * * *